US008659250B2

(12) United States Patent
Maiocchi et al.

(10) Patent No.: US 8,659,250 B2
(45) Date of Patent: Feb. 25, 2014

(54) MANAGEMENT APPARATUS OF A ROTATING MOTOR AND AN ANNEXED LOAD DURING POWER LOSS

(75) Inventors: Giuseppe Maiocchi, Capiago Intimiano (IT); Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 233 days.

(21) Appl. No.: 13/330,410

(22) Filed: Dec. 19, 2011

(65) Prior Publication Data

US 2012/0161678 A1   Jun. 28, 2012

(30) Foreign Application Priority Data

Dec. 23, 2010   (IT) .............................. MI2010A2387

(51) Int. Cl.
*H02P 6/18* (2006.01)
(52) U.S. Cl.
USPC ...... 318/400.34; 318/459; 361/236; 361/244; 361/239; 361/240; 361/243; 324/160; 324/177; 324/163; 324/166; 324/172; 369/53.19; 369/53.41; 369/53.1; 360/77.04; 360/78.04; 360/77.02
(58) Field of Classification Search
USPC ............. 318/400.34, 459; 361/236, 244, 239, 361/240, 243; 324/160, 177, 163, 166, 172; 369/53.19, 53.41, 53.1; 360/77.04, 360/78.04, 77.02
See application file for complete search history.

(56) References Cited

U.S. PATENT DOCUMENTS

| 5,633,568 | A  | * | 5/1997  | Dunfield ................... 318/400.09 |
|-----------|----|---|---------|----------------------------------------|
| 5,675,230 | A  | * | 10/1997 | Dunfield ........................ 318/772 |
| 5,907,453 | A  | * | 5/1999  | Wood et al. ................. 360/97.17 |
| 6,061,198 | A  | * | 5/2000  | Shrinkle ......................... 360/75 |
| 6,566,832 | B2 | * | 5/2003  | Ataee ............................ 318/560 |
| 6,798,603 | B1 | * | 9/2004  | Singh et al. ................. 360/73.03 |
| 6,859,340 | B2 | * | 2/2005  | Brittner et al. .................. 360/75 |
| 6,975,479 | B2 | * | 12/2005 | Kokami et al. ............ 360/77.02 |
| 6,998,801 | B2 | * | 2/2006  | Kurosawa et al. ....... 318/400.27 |
| 7,196,863 | B2 | * | 3/2007  | Sakamoto ....................... 360/75 |
| 7,274,529 | B2 | * | 9/2007  | Ho et al. ......................... 360/75 |
| 2010/0002331 | A1 |  | 1/2010 | Tan |
| 2010/0165811 | A1 |  | 7/2010 | Bonvin |
| 2010/0315738 | A1 |  | 12/2010 | Yamashita et al. |

* cited by examiner

*Primary Examiner* — Rita Leykin
(74) *Attorney, Agent, or Firm* — Seed IP Law Group PLLC (57) ABSTRACT

A management apparatus is described of a rotating motor and a load during power loss; the apparatus comprises a first switching circuit coupled with the rotating motor and a controller of said first switching circuit. The controller is configured to drive the first switching circuit so as to convert a back-electromotive force voltage developed in the rotating motor into a power supply voltage for the load. The first switching circuit is driven in accordance with a first duty cycle. The apparatus comprises a second switching circuit coupled with the load and driven in accordance with a second duty cycle. The controller is configured to vary said first and said second duty cycles to keep the power supply voltage for the load above or equal to a threshold voltage.

25 Claims, 7 Drawing Sheets

MANAGEMENT APPARATUS OF A ROTATING MOTOR AND AN ANNEXED LOAD DURING POWER LOSS

BACKGROUND

1. Technical Field

The present disclosure relates to a management apparatus for controlling a rotating motor, in particular a spindle motor, and of an annexed load, in particular a voice coil motor, during power loss.

2. Description of the Related Art

Hard disks for computers or other electronic devices which comprise one or more magnetic disks for storing data and a magnetic head for reading/writing disks are well known in the state of the art. The disk is assembled on a spindle motor and both the spindle motor and the reading/writing head are controlled by a control device, preferably integrated.

When the hard disk is powered off under normal shutdown conditions, the reading/writing head is arranged in a safety area; the operation is generally called parking the head. The parking is performed by a so-called voice coil motor (VCM).

If it occurs that, during a sudden power loss, the reading/writing head is not parked in the specific area, it may fall on the disk and damage it.

When a sudden power loss occurs, the control device may provide energy for a limited period of time by converting, for example, the kinetic energy of the spindle motor of the hard disk which is still rotating into electric energy.

The energy provided by the kinetic power of the spindle motor, decreased by the energy dissipated by the mechanical frictions of the motor, is available to the VCM as electric power through the control device. The energy available for the VCM is the energy provided by the spindle motor less the energy dissipated by the resistances of the MOS transistors of the control device and the energy dissipated in the motor coils.

The energy provided by the spindle motor is due to the back-electromotive force (BEMF) which, once rectified, provides energy to the VCM motor which acts as an electric load. The BEMF has a sinusoidal form whose frequency is p times the rotation frequency of the motor where p is the number of pairs of rotor poles. The BEMF developed by the spindle motor phases are to be converted into a direct voltage before being provided to the VCM. This may occur by means of the body diodes of the MOS transistors of the control device.

To decrease the dissipation of the body diodes, synchronous rectification technology is currently used. This technology provides switching, under the conditions of turn-on and turn-off, the MOS transistors of the control device in an appropriate sequence; thereby the rectification process is provided with less energy dissipation through the MOS transistors given that the dissipative portion is only depicted by the on resistance Rdson of the transistors. The voltage Vm for driving the VCM is greater than the preceding case.

Figure 1:
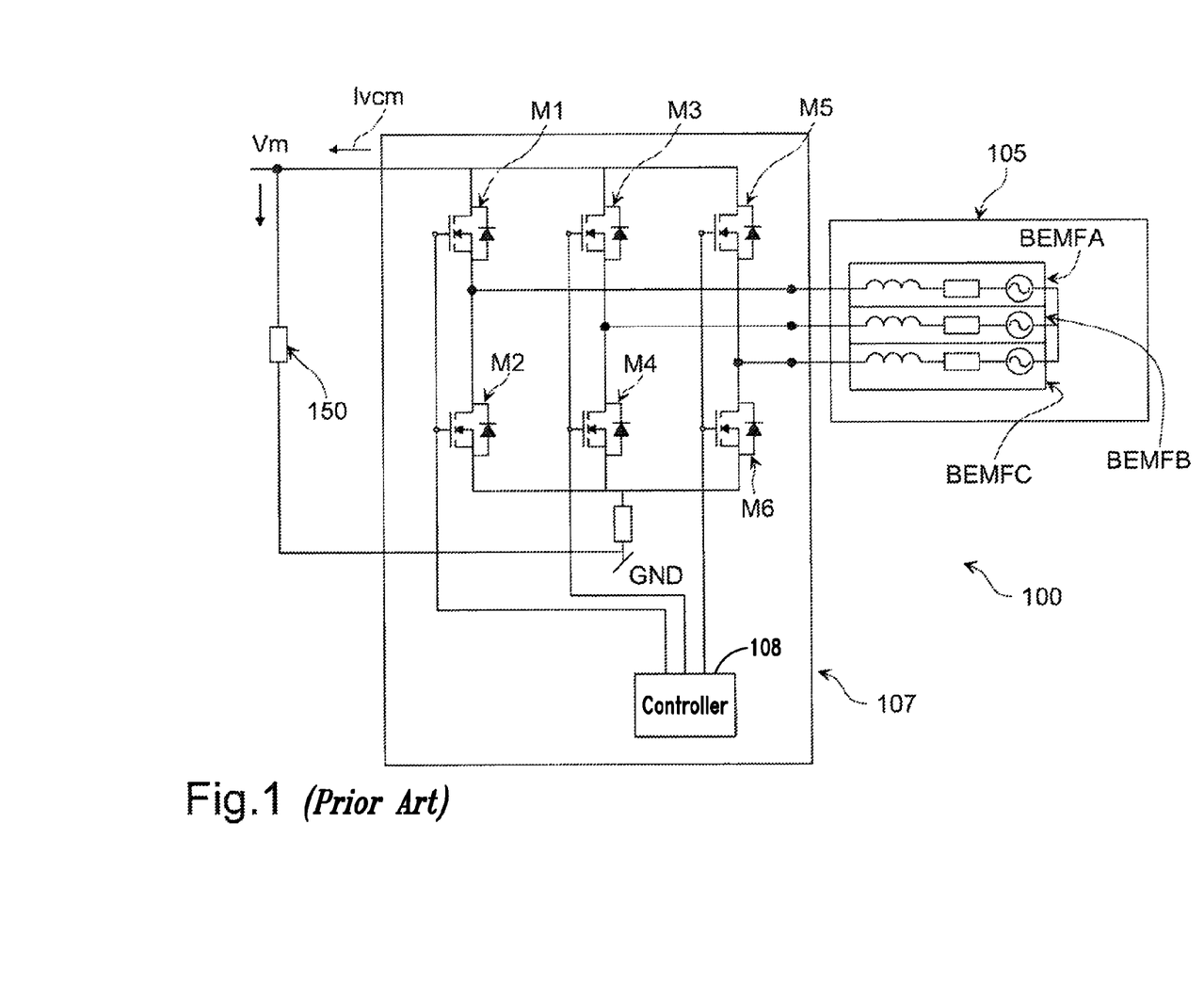
FIG. 1 is a circuit scheme of a system for hard disk in which a spindle motor acts as generator during a sudden power loss.

FIG. 1 shows a circuit scheme of a system 100 for hard disk in which a spindle motor 105 acts as generator during a sudden power loss. The VCM or load 150, absorbs the current provided by the BEMF, BEMFA, BEMFB, BEMFC generated by the spindle motor 105 so that a voltage Vm is provided at the ends of the load 150. The driver of the spindle motor 105 comprises transistor half-bridges M1-M2, M3-M4, M5-M6 controlled by a controller 108 and belonging to an integrated circuit 107; each transistor belonging to the half-bridges is equipped with its body diode.

At every instant, the high side transistor that is turned on by the controller 108, belongs to the half-bridge connected to the coil of the motor whose BEMF has a greater amplitude than the other two BEMFs in the case of three-phase spindle motor, while at every instant, the low side transistor that is turned on belongs to the half-bridge connected to the coil of the spindle motor whose BEMF has a lesser amplitude than the other two BEMFs. The on/off configuration of the transistors changes every 60 electrical degrees.

Figure 2:
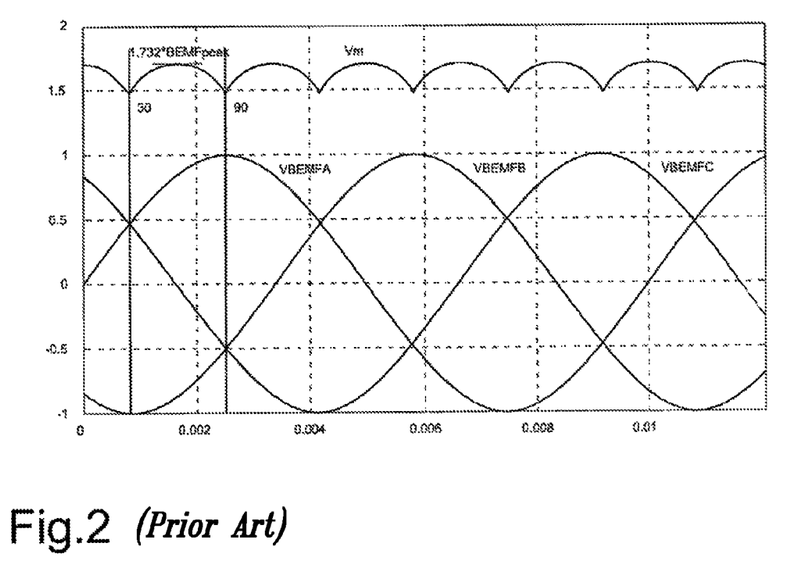
FIG. 2 shows the time diagrams of the voltages BEMFA, BEMFB, BEMFC and of the resulting voltage Vm.

The voltage Vm is a direct voltage with a residual ripple, as shown in FIG. 2.

The ripple frequency is six times the BEMF frequency and its peak amplitude is approximately 1.7 for the BEMF peak.

Figure 3:
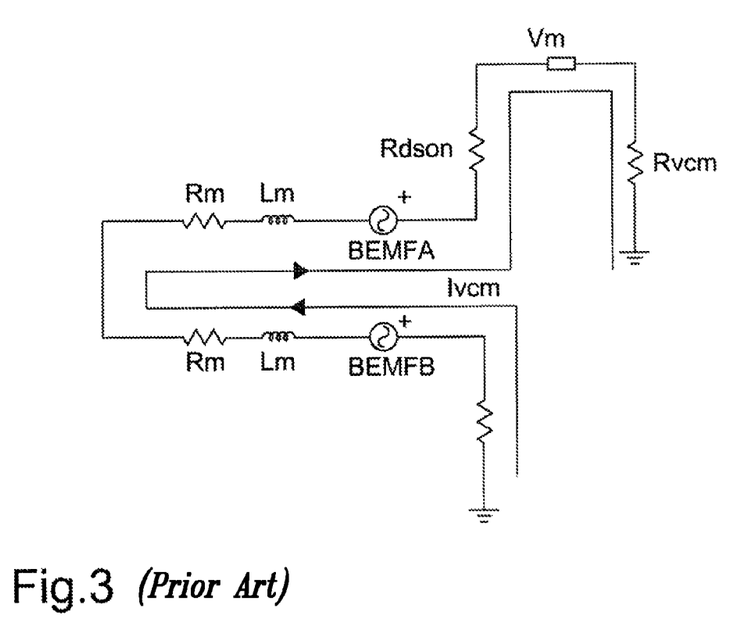
FIG. 3 shows the resulting circuit from FIG. 1 if the VCM may only be considered as a resistive load.

When the VCM is connected to the voltage Vm, it may be considered to a first approximation as a simple resistor Rvcm. The resulting rectifying circuit, in which the resistive load Rvcm is connected to the voltage Vm within 60 degrees, is shown in FIG. 3. The resistances Rdson are the on resistances of the transistors M1 and M4 while the resistances Rm and the inductances Lm are those of the two coils of the spindle motor 105 associated with the BEMF, BEMFA, BEMFB; a current Ivcm flows in the circuit.

The power available to the VCM is a small portion of the kinetic energy available by the spindle motor. If said energy is not enough to complete the parking operation of the head before the voltage Vm reaches the minimum threshold for the operation, the remaining energy is to be supplied to the VCM. This involves a certain energy equalization which may be obtained by means of an impedance control between the spindle motor and the VCM motor.

In most cases the resistance of the spindle motor is lower than the resistance of the VCM and said impedance decoupling prevents the maximum transfer of energy from occurring.

Patent application US 2010/0165811 describes a way to obtain an impedance matching between the spindle motor and the VCM motor. This allows extending the time period in which the voltage Vm generated by the spindle motor remains above the minimum threshold Vth, i.e., the minimum voltage to allow the integrated control device to operate.

Figure 4:
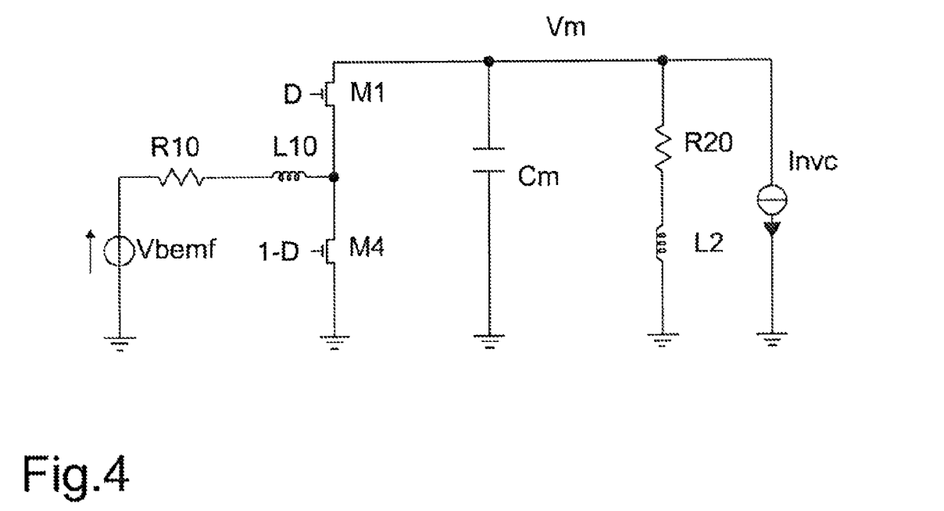
FIG. 4 shows the simplified circuit equivalent to the circuit in FIG. 3.
Figure 5:
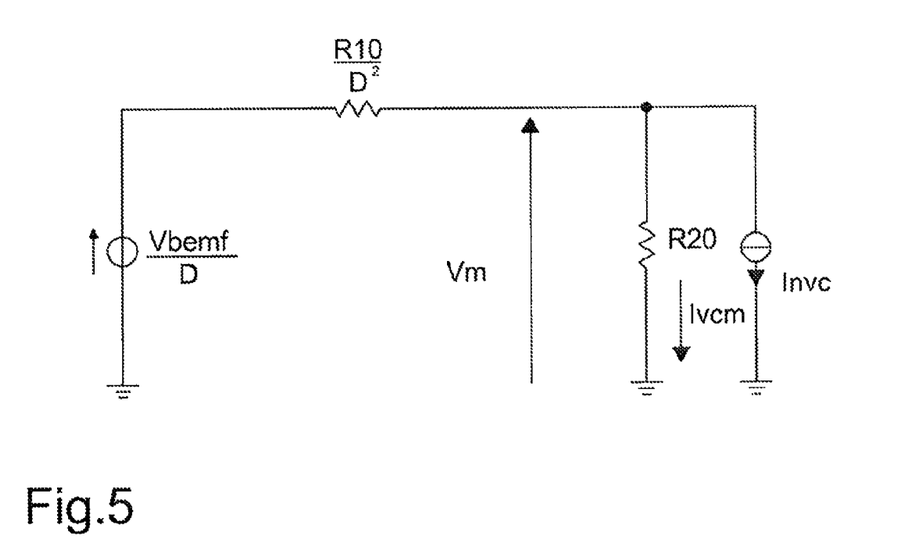
FIG. 5 shows the equivalent circuit to the circuit in FIG. 4 in accordance with Thevenin's Theorem.

US 2010/0165811 describes a system which, by conveniently controlling the driving signals of the MOS transistors connected to the coils of the spindle motor, may increase the period of time in which the voltage Vm remains above the voltage Vth. The circuit in FIG. 3 may be transformed into the circuit in FIG. 4, i.e., the circuit in FIG. 4 is equivalent to the one in FIG. 3, in which $R10=2*Rm+2*Rdson$ and $R20=Rvcm+2*Rdson$ is indicated in the portion of 60 electrical degrees considered, and in which there is a switching circuit consisting of the half-bridge having the transistor M1 as high side and the transistor M4 as low side, which are driven with one duty cycle D and one 1-D, respectively. The circuit in FIG. 4 comprises a capacitor Cm for filtering the ripple and a current generator Invc, which represents other devices connected to the VCM, e.g., a memory reading/writing channel, and at the ends of which there is the voltage Vm. By applying Thevenin's Theorem to such a circuit in FIG. 4, the circuit in FIG. 5 is obtained. A voltage generator Vbemf/D is applied to a resistance $R10/D^2$ and to a parallel of another resistance R20 and the current generator Invc. One can obtain the maximum power transfer by making the resistance $R10/D^2$ to be equal to the impedance due to the parallel of R20 and Invc and the following is obtained:

$$D = \frac{R10*Invc + \sqrt{R10^2*Invc^2 + \frac{Vbemf^2*R10}{R20}}}{Vbemf}$$

If Invc=0, i.e., if the energy absorbed by other devices connected to the VCM, e.g., a memory reading/writing chan nel, is negligible, the perfect impedance matching is obtained when $$D = \sqrt{\frac{R10}{R20}}.$$

Again, in accordance with said prior art, the best strategy for keeping the voltage Vm higher than the threshold voltage Vth as long as possible is the one of starting the driving of VCM by supplying to it a voltage Vm and imposing D=1, i.e., with synchronous rectification, once the hard disk is off due to sudden power loss. The duty cycle D is gradually decreased from 1 to its optimum value $$D = \sqrt{\frac{R10}{R20}}$$

each time the voltage Vm reaches the minimum threshold Vth from its maximum value.

BRIEF SUMMARY

One embodiment of the present disclosure is a management apparatus for controlling a rotating motor, in particular a spindle motor, and of an annexed load, in particular a voice coil motor, which keeps the power supply voltage for the voice coil motor above a minimum threshold voltage as long as possible, with respect to the devices known, in case of sudden power loss.

One embodiment is a management apparatus for controlling a rotating motor and a load during power loss. The apparatus includes a first switching circuit coupled with the rotating motor, a second switching circuit could with the load, and a controller configured to control the first and second switching circuits. The controller is configured to drive said first switching circuit so as to convert a back electromotive force voltage developed in the rotating motor into a power supply voltage for the load. The controller is configured to drive the first switching means in accordance with a first duty cycle and the second switching circuit in accordance with a second duty cycle. The controller is configured to vary the values of said first and said second duty cycle to keep said power supply voltage for the load above or equal to a threshold voltage.

Preferably the rotating motor is a multi-phase motor and in particular, a spindle motor while the load is preferably a voice coil motor.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which.

DETAILED DESCRIPTION

Figure 6:
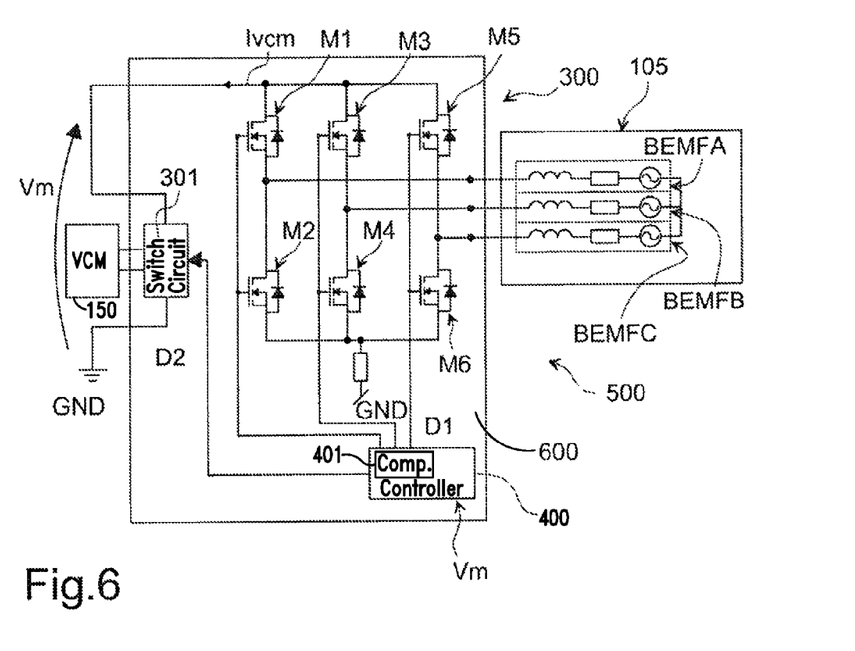
FIG. 6 is the circuit scheme of a motor system that includes a management apparatus for controlling a rotating motor, in particular a spindle motor, and of an annexed load, in particular a voice coil motor, during power loss in accordance with the present disclosure.

FIG. 6 shows motor system that includes a management apparatus 500; a rotating motor, i.e., a motor that develops a back-electromotive force, preferably the rotating motor is of multi-phase type with at least three phases and in particular a spindle motor 105; and a load which absorbs energy, in particular a voice coil motor (VCM) 150, during power loss in accordance with the present disclosure. The apparatus preferably is integrated into a semiconductor chip 600. The apparatus 500 conveniently drives the spindle motor 105 of a hard disk to take advantage of the back-electromotive voltages or BEMF voltages of the spindle motor 105, in particular the BEMF voltages of the phases of the spindle motor 105, and to transform them into a power supply voltage Vm to be applied to the VCM 150 so as to allow the head to be parked, which moves from the VCM 150 into its parking position.

The apparatus 500 comprises a first switching circuit 300, in particular the three half-bridges of MOS transistors M1-M2, M3-M4, M5-M6, coupled with the spindle motor 105. The controller 400 is configured to drive said first switching circuit so as to convert the back-electromotive force voltages BEMFA, BEMFB, BEMFC, developed in the spindle motor 105, into a power supply voltage Vm for the voice coil motor 150.

The first switching circuit 300 is driven in accordance with a first duty cycle D1, in particular the duty cycle D1 for each pair of MOS transistors M1-M6 which is coupled each time with the spindle motor 105 to generate the voltage Vm by performing a synchronous rectification, as better explained above in the description relating to FIGS. 1-4 and in particular to FIG. 2.

In accordance with the disclosure, the apparatus 500 comprises a second switching circuit 301, coupled with the voice coil motor 150 and driven in accordance with a second duty cycle D2. The controller 400 is configured to vary the first D1 and the second D2 duty cycle to keep the power supply voltage Vm for the voice coil motor 150 above or equal to a threshold voltage Vth, i.e., the minimum threshold voltage to ensure the operation of the apparatus 500, for as long as possible. The duty cycles D1 and D2 determine the on and off time periods of the switching circuits 300 and 301.

Figure 7:
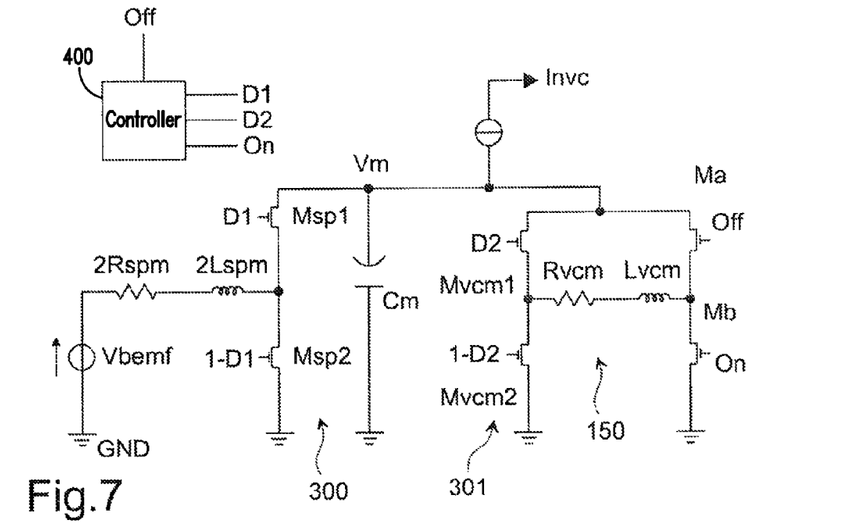
FIG. 7 shows a simplified circuit of the apparatus in FIG. 6.

FIG. 7 shows a simplified circuit of the apparatus in FIG. 6. The motor spindle 105 is diagrammatically shown as the series of a voltage generator Vbemf (e.g., the voltage of the two BEMFs BEMFA and BEMFB), a resistance 2*Rspm (e.g., the resistance R10 in FIG. 4) and an inductance 2*Lspm (e.g., the inductance L10 in FIG. 4) arranged between the ground GND and the center point of a half-bridge with transistors Msp1 and Msp2 (i.e., a high side transistor and a low side transistor of the half-bridges M1-M2, M3-M4, M5-M6 in FIG. 1, e.g., Msp1=M1 and Msp2=M4) driven with a duty cycle D1 and (1-D1), respectively. The half-bridge Msp1, Msp2 is comprised between the power supply voltage Vm and ground GND. The transistors Msp1 and Msp2 represent the high side and low side transistors of the half-bridges M1-M2, M3-M4, M5-M6 which are involved in the conversion of the two BEMFs between the BEMFs BEMFA, BEMFB, BEMFC of the spindle motor 105 every 60 electrical degrees. At every instant, the high side transistor that is turned on by the controller 400 belongs to the half-bridge connected to the coil of the motor whose BEMF has a greater amplitude than the other two BEMFs in case of three-phase spindle motor, while at every instant, the low side transistor that is turned on belongs to the half-bridge connected to the coil of the spindle motor whose BEMF has a lesser amplitude than the other two BEMFs. The on-off configuration of the transistors changes every 60 electrical degrees.

The voltage Vm generated by the spindle motor 105 is at the ends of the VCM motor 150 which may be circuitly represented by a series of an inductance Lvcm and a resistance Rvcm connected between the center points of a pair of transistor half-bridges Mvcm1, Mvcm2 and Ma, Mb, which belong to the switching device 301, and a current generator Invc; a capacitor Cm is arranged in parallel to the half-bridges Mvcm1, Mvcm2 and Ma, Mb to filter the voltage Vm. The components Rvcm, Lvcm represent the load 150 of the voice coil motor while the current generator Invc represents the current absorbed by other devices, e.g., memory reading/writing devices, etc. The transistor Ma is always off (Off status) and the transistor Mb is always on (On status) while the transistors Mvcm1 and Mvcm2 are driven by the controller 400 with a duty cycle D2 and (1-D2), respectively. The controller 400 controls all the transistors Msp1, Msp2, Mvcm1, Mvcm2, Ma, Mb.

Figure 8:
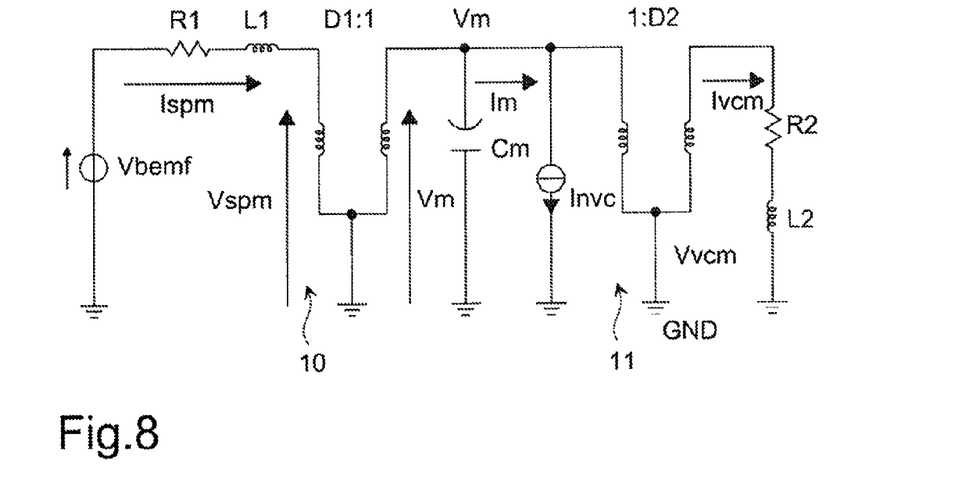
FIG. 8 shows a circuit similar to the circuit in FIG. 7 with impedance transformers in place of the switching means.

The circuit in FIG. 7 may be transformed into the circuit in FIG. 8 where the transformers 10 and 11 operate as switching devices 300 and 301 of the circuit in FIG. 7, i.e., as impedance matching networks with transforming ratio D1:1 and 1:D2. It occurs: R1=2*Rspm*Rdson with Rdson on resistance of the transistor, L1=2*Lspm, L2=Lvcm and R2=Rvcm+2*Rdson; in the circuit in FIG. 8, due to the current Ispm which circulates through the primary winding, the voltage Vspm to the primary is converted by the transformer 10 into voltage Vm to the secondary. The voltage Vm on the primary of the transformer 11 is converted into voltage Vvcm on the secondary of the transformer 11 and there is a current Ivcm through the elements R2 and L2 arranged in series.

Figure 9:
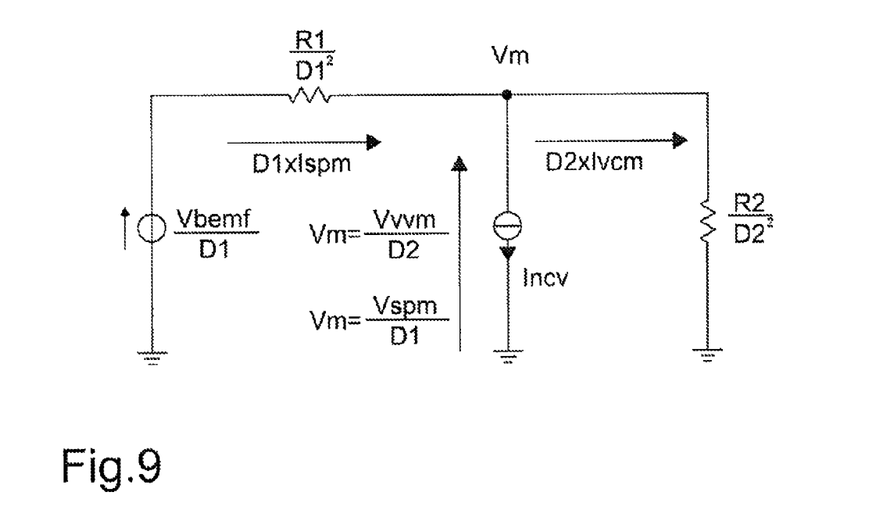
FIG. 9 shows the equivalent circuit to the circuit in FIG. 8 in accordance with Thevenin's Theorem.

By applying Thevenin's Theorem to the circuit in FIG. 8, the equivalent circuit is shown in FIG. 9. A voltage generator Vbemf/D1 is applied to a resistance $R1/D1^2$ and to a parallel of another resistance $R2/D2^2$ and a current generator Invc and to the ends of which there is the current Vm. The current D1*Ispm flows on the resistance $R1/D1^2$ while the current D2*Ivcm flows on the resistance $R2/D2^2$. The voltage Vm is equal to Vvcm/D2 or to Vspm/D1.

Using the circuit in FIG. 9 the voltages and the currents in the circuit in FIG. 8 may be calculated. The result is:

$$Ivcm = \frac{Vbemf * D1 * D2 - R1 * Invc * D2}{R2 * D1^2 + R1 * D2^2},$$

$$Vvcm = R2 * Ivcm \text{ and}$$

$$Pvcm = R2 * Ivcm^2 = R2 * \left(\frac{Vbemf * D1 * D2 - R1 * Invc * D2}{R2 * D1 + R1 * D2}\right)^2.$$

If $Invc = 0$ the result is: $\frac{D1}{D2} = \sqrt{\frac{R1}{R2}}$.

Thereby, to keep the maximum power transfer from the spindle motor 105 to the voice coil motor 150, the ratio of the duty cycles D1 and D2 is to be kept equal to the square root of the ratio of the two resistances. The maximum value of the power Pvcm is obtained with D2=1 and $$D1 = \sqrt{\frac{R1}{R2}}.$$

Figure 10:
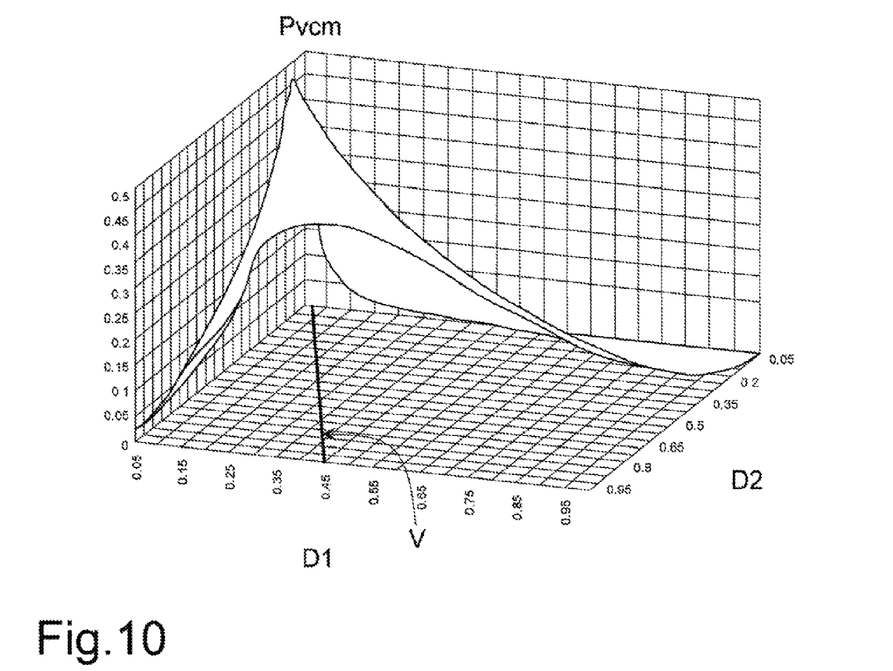
FIG. 10 is a graph of the power of the VCM according to the duty cycles D1 and D2.

Increased power may not be supplied to the VCM by acting on the duty cycle D2, but the voltage Vm may be kept above the minimum threshold Vth for longer, thus decreasing the current Ivcm of the VCM and therefore the power Pvcm. The value of the voltage Vm is kept above the minimum threshold Vth by decreasing the value D1 step y step and recalculating D2 so as to follow the line V indicated in the graph in FIG. 10. Once the energy available is no longer capable of keeping the voltage Vm above the threshold voltage Vth, the parking process finishes naturally.

If the current Invc is different than zero, the result is:

$$D1 = \frac{R1 * Invc}{Vbemf} + \sqrt{\left(\frac{R1 * Invc}{Vbemf}\right)^2 + \frac{R1}{R2} * D2^2} \text{ or}$$

$$D2 = \sqrt{\left(D1^2 - \frac{2 * D1 * R1 * Invc}{Vbemf}\right) * \frac{R2}{R1}}.$$

There are various possible methods for keeping the voltage Vm above the minimum threshold Vth.

Figure 11:
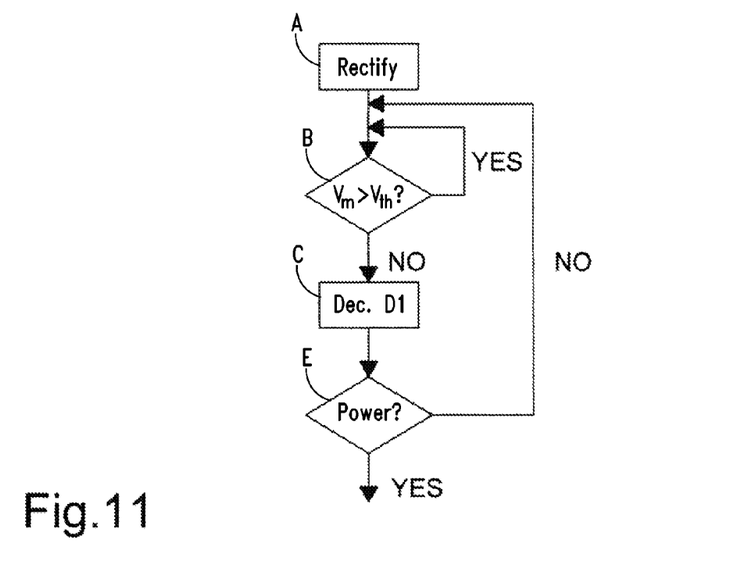
FIG. 11 shows a flow diagram in accordance with a first operating mode of the management apparatus.

A first method, whose steps are shown in FIG. 11, comprises a first step A in which the controller 400, with a sudden external power loss, controls the switching devices 300 and 301 to execute the synchronous rectification, i.e., the controller 400 forces the duty cycle D1=1 while the duty cycle $$D2 = \sqrt{\left(1 - \frac{2 * R1 * Invc}{Vbemf}\right) * \frac{R2}{R1}}.$$

If Invc=0, the result is $D2^2=R2/R1$ with the maximum value of D2=1.

In the second step B, the voltage Vm is compared with the threshold voltage Vth, by means for example of comparison means 401 belonging to the drive device 400; if the voltage Vm stays above the voltage Vth (indicated by "YES") the values of D1 and D2 are not further changed, otherwise (indicated by "NO") a third step C is involved in which the controller decreases, by a preset value, the value of the duty cycle D1 from 1 to its minimum value, e.g., 0, and the value of the duty cycle D2 given by the preceding equation, is calculated There is a further control step E in which it is checked if there is still a power loss or if the minimum value of D1 has been obtained; in case of power loss, with D1 greater than its minimum value (indicated by "NO"), step B is gone back to and it is checked if the voltage Vm is greater than the voltage Vth. If affirmative, the duty cycles D1 and D2 are not changed while if the voltage Vm is less than the threshold voltage Vth the value of D1 is decreased by a preset value and the value of the duty cycle D2 given by the preceding equation, is calculated.

The steps B, C and E are repeated until the status (indicated by "YES") is obtained which identifies the minimum value of D1 (D1min) or the return of the external power end of power off.

The operations of the aforesaid first method are all executed by the controller 400.

A second method (shown in FIG. 12) comprises a first step A1 in which the controller 400, with a sudden external power loss, controls the switching devices 300 and 301 to execute the synchronous rectification, i.e., the controller 400 forces the duty cycle D1=1 while the duty cycle D2=1.

Figure 12:
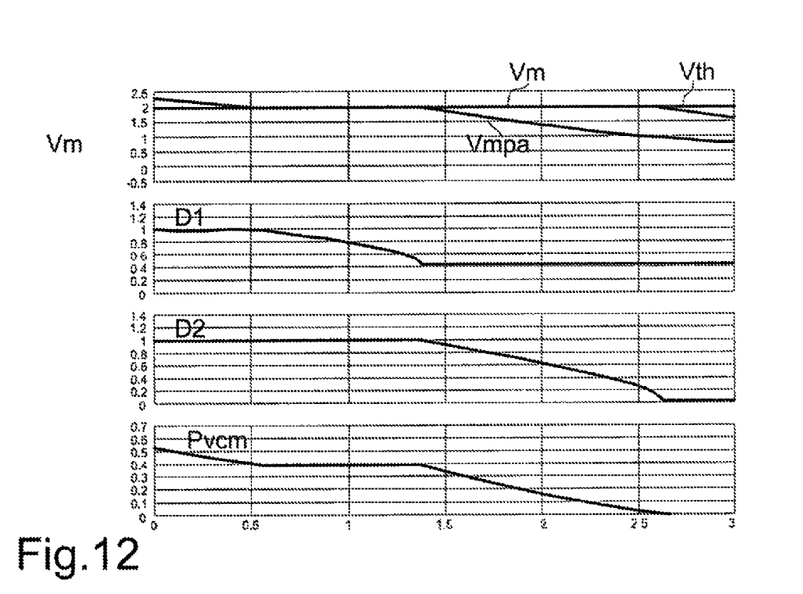
FIG. 12 shows a flow diagram in accordance with a second operating mode of the management apparatus.

In the second step B1, the voltage Vm is compared with the threshold voltage Vth, by means for example of a comparator 401 belonging to the controller 400; if the voltage Vm stays above the voltage Vth (indicated by "YES") the values of D1 and D2 are not further changed, otherwise (indicated by "NO") a third step C1 is involved in which the controller 400 always forces D2=1 and decreases, by a preset value, the value of the duty cycle D1 from 1 to its minimum value D1opt. In the successive step E1 it is checked if the voltage Vm is greater than the threshold voltage Vth; if the voltage Vm stays above the voltage Vth (indicated with "YES") the values of D1 and D2 are not further changed, otherwise (indicated with "NO") a step G1 is involved where it is checked if the minimum value D1opt has been obtained. If the minimum value D1opt (indicated with "NO") has not been obtained, steps B1, C1 and E1 are repeated. The value D1opt is given by the value of D1 for which the impedances are coupled, i.e.:

$$D1 = \frac{R1*Invc}{Vbemf} + \sqrt{\left(\frac{R1*Invc}{Vbemf}\right)^2 + \frac{R1}{R2}}$$

Once the minimum value D1opt (indicated with YES) has been obtained, a further step H1 is involved in which the controller 400 decreases, by a preset value, the value of the duty cycle D2 from 1 until its minimum value D2min, e.g., 0, and by calculating D1 as described in the preceding equation. In the successive step P1 it is checked if the voltage Vm is greater than the threshold voltage Vth; if the voltage Vm stays above the voltage Vth (indicated with "YES") the values of D1 and D2 are not further changed, otherwise (indicated with "NO") a step Q1 is involved where it is checked if the minimum value D2min has been obtained or if there is still a status of power loss. If the minimum value D2min has not been obtained and there is still a power loss (indicated with "NO"), the steps H1, P1 and Q1 are repeated until the minimum value is obtained of D2 or if the external power is returned (indicated with "YES").

Figure 13:
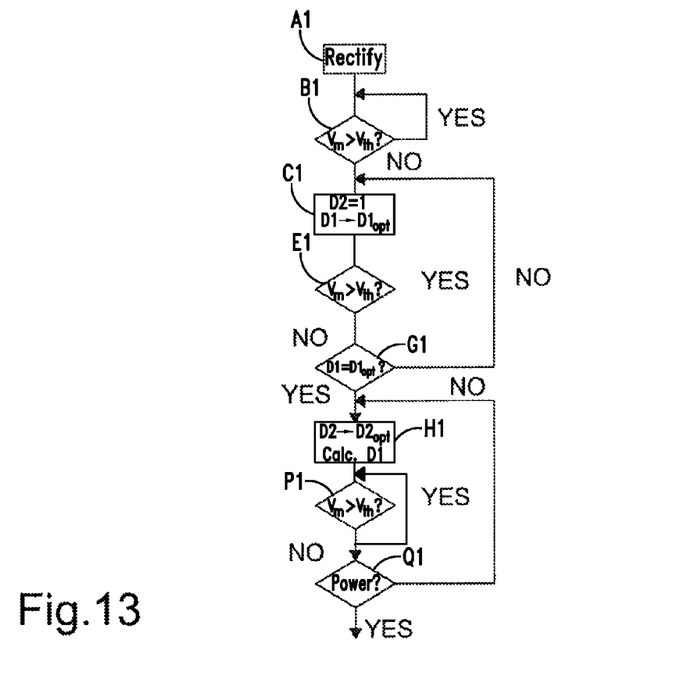
FIG. 13 shows the time diagrams of the voltage Vm, of the power Pvcm, of the duty cycles D1 and D2 for the management apparatus in accordance with the disclosure in the case of the operating mode in FIG. 12.

FIG. 13 shows the time diagrams of the voltage Vm, of the voltage Vth, of the power Pvcm, of the duty cycles D1 and D2 if the controller operates in accordance with the second operating method. It should be noted that, unlike the case of known art in which the voltage Vm (indicated by Vmpa) quickly decreases below the voltage Vth after the value of the duty cycle D1 has reached its minimum, the voltage Vm with the system in accordance with the disclosure is kept constantly above or equal to the voltage Vth for a greater period of time and i.e., until the duty cycle D2 has reached its minimum value.

In accordance with a third operating method, the controller 400, with a sudden power loss, controls the switching devices 300 and 301 to execute the synchronous rectification, i.e., the controller 400 forces the duty cycle D1=1 and the duty cycle D2=1.

In the second step, the voltage Vm is compared with the threshold voltage Vth, by means for example of comparison means belonging to the drive device 400; if the voltage Vm stays above the voltage Vth (indicated by "NO") the values of D1 and D2 are not further changed, otherwise (indicated by "YES") a third step is involved in which the controller 400 forces D2=0.5 and decreases, by a preset value, the value of the duty cycle D1 from 1 to its minimum value D1min, e.g., 0, again by checking that the voltage Vm is greater than the threshold voltage Vth.

The method ends once the minimum value D1min is obtained or when the external power is returned.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A management apparatus for controlling a rotating motor and a load during power loss, said apparatus comprising:
    a first switching circuit configured to be coupled with the rotating motor;
    a second switching circuit configured to be coupled with the load; and
    a controller configured to control said first and second switching circuits, cause said first switching circuit to convert a back-electromotive force voltage of the rotating motor into a power supply voltage for the load, drive said first switching circuit in accordance with a first duty cycle and drive the second switching circuit in accordance with a second duty cycle, and vary said first and said second duty cycles to keep said power supply voltage for the load above or equal to a threshold voltage.

2. An apparatus according to claim 1, wherein said controller is configured to control the first and the second switching circuits and to perform a synchronous rectification of said back-electromotive force voltage.

3. An apparatus according to claim 1, wherein said controller is configured to:
    force the first duty cycle equal to one at an initial instant of power loss, said compare said power supply voltage with said threshold voltage;
    decrease, by a prefixed value, said first duty cycle each time the power supply voltage decreases below the threshold voltage; and
    set the second duty cycle as a function of the first duty cycle.

4. An apparatus according to claim 3, wherein said controller is configured to set the second duty cycle as a function of the first duty cycle in accordance with the following equation:

$$D2 = \sqrt{\left(D1^2 - \frac{2*D1*R1*Invc}{Vbemf}\right)*\frac{R2}{R1}}$$

where D1 is the first duty cycle, Vbemf indicates the back-electromotive force voltage of the rotating motor, R1 and R2 are equivalent resistances of the rotating motor and of the load, respectively, D2 is the second duty cycle, and Invc is a current indicating current dissipated by further electronic devices connected to the load.

5. An apparatus according to claim 1, wherein said controller includes a comparator configured to compare said power supply voltage with said threshold voltage and the controller is configured to:

force the first duty cycle and the second duty cycle equal to 1 at an initial instant of power loss;

decrease, by a prefixed value, said first duty cycle each time the power supply voltage decreases below the threshold value until arriving at a first duty cycle value;

after arriving at the first duty cycle value, decrease, by a prefixed value, said second duty cycle each time the power supply voltage decreases below the threshold voltage until a minimum value of the second duty cycle is achieved; and set the first duty cycle as a function of the second duty cycle.

6. An apparatus according to claim 5, wherein said controller is configured to set the first duty cycle as a function of the second duty cycle in accordance with the following relation:

$$D1 = \frac{R1*Invc}{Vbemf} + \sqrt{\left(\frac{R1*Invc}{Vbemf}\right)^2 + \frac{R1}{R2}*D2^2}$$

where D2 is the second duty cycle, Vbemf indicates the back-electromotive force voltage of the rotating motor, R1 and R2 are equivalent resistances of the rotating motor and of the load, respectively, D1 is the first duty cycle, and Invc is a current indicating current dissipated by further electronic devices connected to the load.

7. An apparatus according to claim 5, wherein said first duty cycle value is given by:

$$D1opt = \frac{R1*Invc}{Vbemf} + \sqrt{\left(\frac{R1*Invc}{Vbemf}\right)^2 + \frac{R1}{R2}}$$

where Vbemf indicates the back-electromotive force voltage, R1 and R2 are equivalent resistances of the rotating motor and of the load, respectively, D1opt is the first duty cycle value, and Invc is a current indicating current dissipated by further electronic devices connected to the load.

8. An apparatus according to claim 1, wherein:

said first switching circuit includes a first half-bridge that includes first and second transistors coupled between a power supply voltage terminal, configured to receive said power supply voltage, and ground; and said second switching circuit includes:

a second half-bridge that includes third and fourth transistors coupled between the power supply terminal and ground; and a third half-bridge that includes fifth and sixth transistors coupled between the power supply terminal and ground, the fifth transistor being configured to be always turned off, the sixth transistor being configured to be always turned on, the second and the third half-bridges having respective center points configured to be coupled to the load.

9. A system, comprising:

a rotatable motor a first switching circuit coupled to the rotatable motor;

a second switching circuit configured to be coupled with a load; and a controller configured to control said first and second switching circuits in accordance with first and second duty cycles, respectively, cause said first switching circuit to convert a back-electromotive force voltage in the rotatable motor into a power supply voltage for the load, and vary said first and said second duty cycles to keep said power supply voltage for the load above or equal to a threshold voltage.

10. A system according to claim 9, wherein said controller is configured to control the first and the second switching circuits and to perform a synchronous rectification of said back-electromotive force voltage.

11. A system according to claim 9, wherein said controller is configured to:

force the first duty cycle equal to one at an initial instant of power loss, said compare said power supply voltage with said threshold voltage;

decrease, by a prefixed value, said first duty cycle each time the power supply voltage decreases below the threshold voltage; and set the second duty cycle as a function of the first duty cycle.

12. A system according to claim 11, wherein said controller is configured to set the second duty cycle as a function of the first duty cycle in accordance with the following equation:

$$D2 = \sqrt{\left(D1^2 - \frac{2*D1*R1*Invc}{Vbemf}\right)*\frac{R2}{R1}}$$

where D1 is the first duty cycle, Vbemf indicates the back-electromotive force voltage of the rotating motor, R1 and R2 are equivalent resistances of the rotating motor and of the load, respectively, D2 is the second duty cycle, and Invc is a current indicating current dissipated by further electronic devices connected to the load.

13. A system according to claim 9, wherein said controller includes a comparator configured to compare said power supply voltage with said threshold voltage and the controller is configured to:

force the first duty cycle and the second duty cycle equal to 1 at an initial instant of power loss;

decrease, by a prefixed value, said first duty cycle each time the power supply voltage decreases below the threshold value until arriving at a first duty cycle value;

after arriving at the first duty cycle value, decrease, by a prefixed value, said second duty cycle each time the power supply voltage decreases below the threshold voltage until a minimum value of the second duty cycle is achieved; and set the first duty cycle as a function of the second duty cycle.

14. A system according to claim 13, wherein said controller is configured to set the first duty cycle as a function of the second duty cycle in accordance with the following relation:

$$D1 = \frac{R1*Invc}{Vbemf} + \sqrt{\left(\frac{R1*Invc}{Vbemf}\right)^2 + \frac{R1}{R2}*D2^2}$$

where D2 is the second duty cycle, Vbemf indicates the back-electromotive force voltage of the rotating motor, R1 and R2 are equivalent resistances of the rotating motor and of the load, respectively, D1 is the first duty cycle, and Invc is a current indicating current dissipated by further electronic devices connected to the load.

15. A system according to claim 13, wherein said first duty cycle value is given by:

$$D1opt = \frac{R1*Invc}{Vbemf} + \sqrt{\left(\frac{R1*Invc}{Vbemf}\right)^2 + \frac{R1}{R2}}$$

where Vbemf indicates the back-electromotive force voltage, R1 and R2 are equivalent resistances of the rotating motor and of the load, respectively, D1opt is the first duty cycle value, and Invc is a current indicating current dissipated by further electronic devices connected to the load.

16. A system according to claim 9, wherein:
said first switching circuit includes a first half-bridge that includes first and second transistors coupled between a power supply voltage terminal, configured to receive said power supply voltage, and ground; and
said second switching circuit includes:
a second half-bridge that includes third and fourth transistors coupled between the power supply terminal and ground; and
a third half-bridge that includes fifth and sixth transistors coupled between the power supply terminal and ground, the fifth transistor being configured to be always turned off, the sixth transistor being configured to be always turned on, the second and the third half-bridges having respective center points configured to be coupled to the load.

17. A system according to claim 9, wherein said motor is a hard disk spindle motor and said load is a voice coil motor.

18. A management method for controlling a rotating motor and a load during power loss, said method comprising:
converting a back-electromotive force voltage of the rotating motor into a power supply voltage for the load;
driving a first switching circuit, coupled with the rotating motor, in accordance with a first duty cycle;
driving a second switching circuit, coupled to the load, in accordance with a second duty cycle; and
keeping said power supply voltage for the load above or equal to a threshold voltage by varying said first and second duty cycles.

19. A method according to claim 18, wherein driving the first switching circuit and driving the second switching circuit include performing a synchronous rectification of said back-electromotive force voltage.

20. A method according to claim 18, comprising:
forcing the first duty cycle equal to one and making the second duty cycle be a function of the first duty cycle at an initial instant of power loss;
successively comparing said power supply voltage with said threshold voltage;
successively decreasing, by a prefixed value, said first duty cycle each time the power supply voltage decreases below the threshold voltage; and
setting the second duty cycle again as a function of the first duty cycle until a minimum value of the first duty cycle is achieved or the power off ends.

21. A method according to claim 20, wherein setting the second duty cycle as a function of the value of the first duty cycle includes setting the second duty cycle in accordance with the following equation:

$$D2 = \sqrt{\left(D1^2 - \frac{2*D1*R1*Invc}{Vbemf}\right)*\frac{R2}{R1}}$$

where D1 is the first duty cycle, Vbemf indicates the back-electromotive force voltage, R1 and R2 are equivalent resistances of the rotating motor and the load, respectively, D2 is the second duty cycle, and Invc is a current indicating current dissipated by further electronic devices connected to the load.

22. A method according to claim 18, comprising, in succession:
forcing the first and the second duty cycles equal to 1 at an initial instant of power loss;
comparing said power supply voltage with said threshold voltage;
decreasing, by a prefixed value, said first duty cycle each time the power supply voltage decreases below the threshold value until a first duty cycle value is obtained;
after obtaining the first duty cycle value, decreasing, by a prefixed value, said second duty cycle each time the power supply voltage decreases below the threshold voltage; and
setting the first duty cycle as a function of the second duty cycle until a minimum value of the second duty cycle is achieved or the power loss ends.

23. A method according to claim 22, wherein setting the first duty cycle as a function of the second duty cycle occurs in accordance with the following relation:

$$D1 = \frac{R1*Invc}{Vbemf} + \sqrt{\left(\frac{R1*Invc}{Vbemf}\right)^2 + \frac{R1}{R2}*D2^2}$$

where D2 is the second duty cycle, Vbemf indicates the back-electromotive force voltage, R1 and R2 are equivalent resistances of the rotating motor and of the load, respectively, D1 is the first duty cycle, and Invc is a current indicating current dissipated by further electronic devices connected to the load.

24. A method according to claim 22, wherein said first duty cycle value is given by:

$$D1opt = \frac{R1*Invc}{Vbemf} + \sqrt{\left(\frac{R1*Invc}{Vbemf}\right)^2 + \frac{R1}{R2}}$$

where Vbemf indicates the back-electromotive force voltage, R1 and R2 are equivalent resistances of the rotating motor and of the load, respectively, D1opt is the first duty cycle, and Invc is a current indicating current dissipated by further electronic devices connected to the load.

25. A method according to claim 18, wherein said rotating motor is a hard disk spindle motor and said load is a voice coil motor.

* * * * *